Dec. 29, 1959 R. G. DEXTER 2,918,828
DRIVING MECHANISM

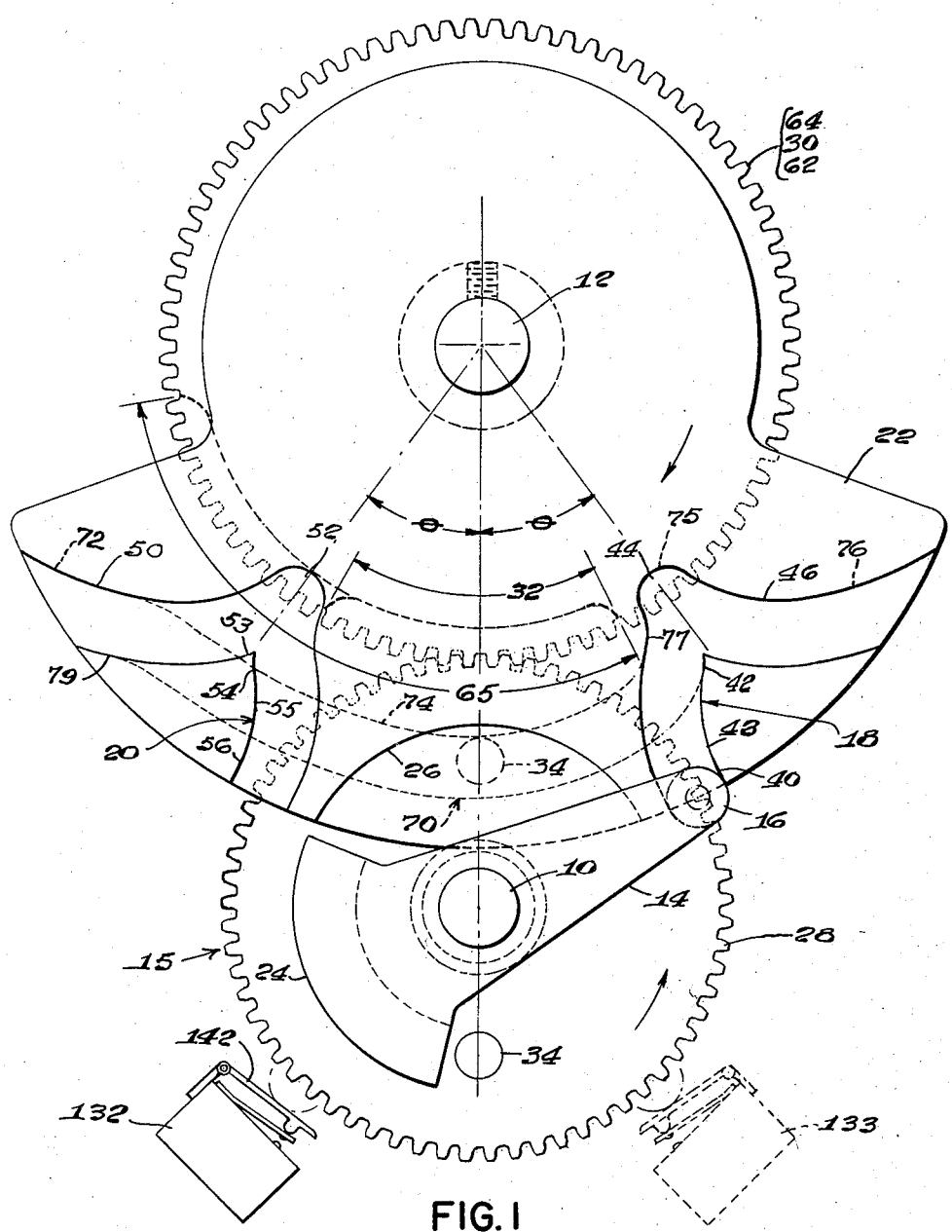
FIG. I

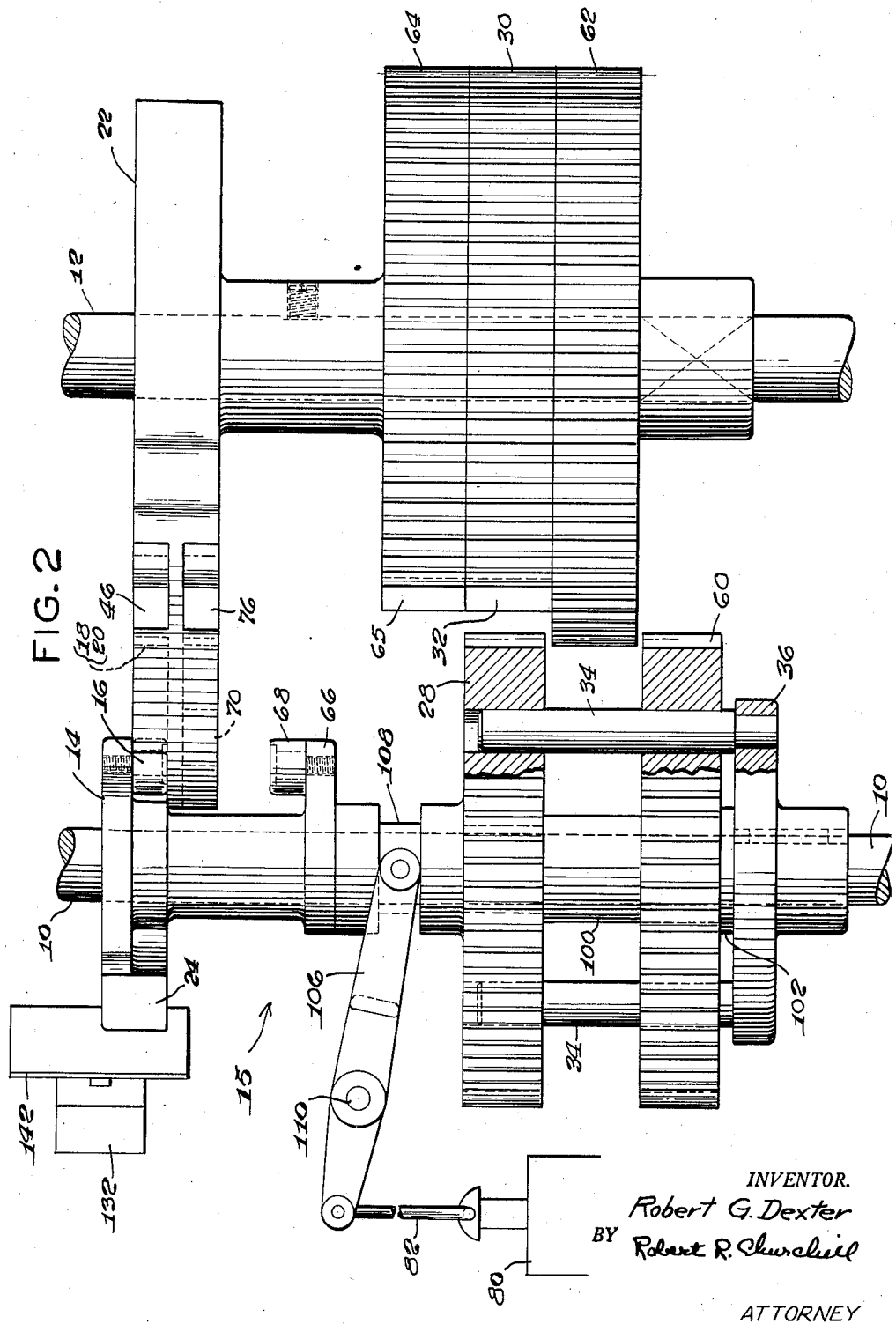

Filed May 22, 1957 5 Sheets-Sheet 4

INVENTOR.
Robert G. Dexter
BY Robert R. Churchill
ATTORNEY

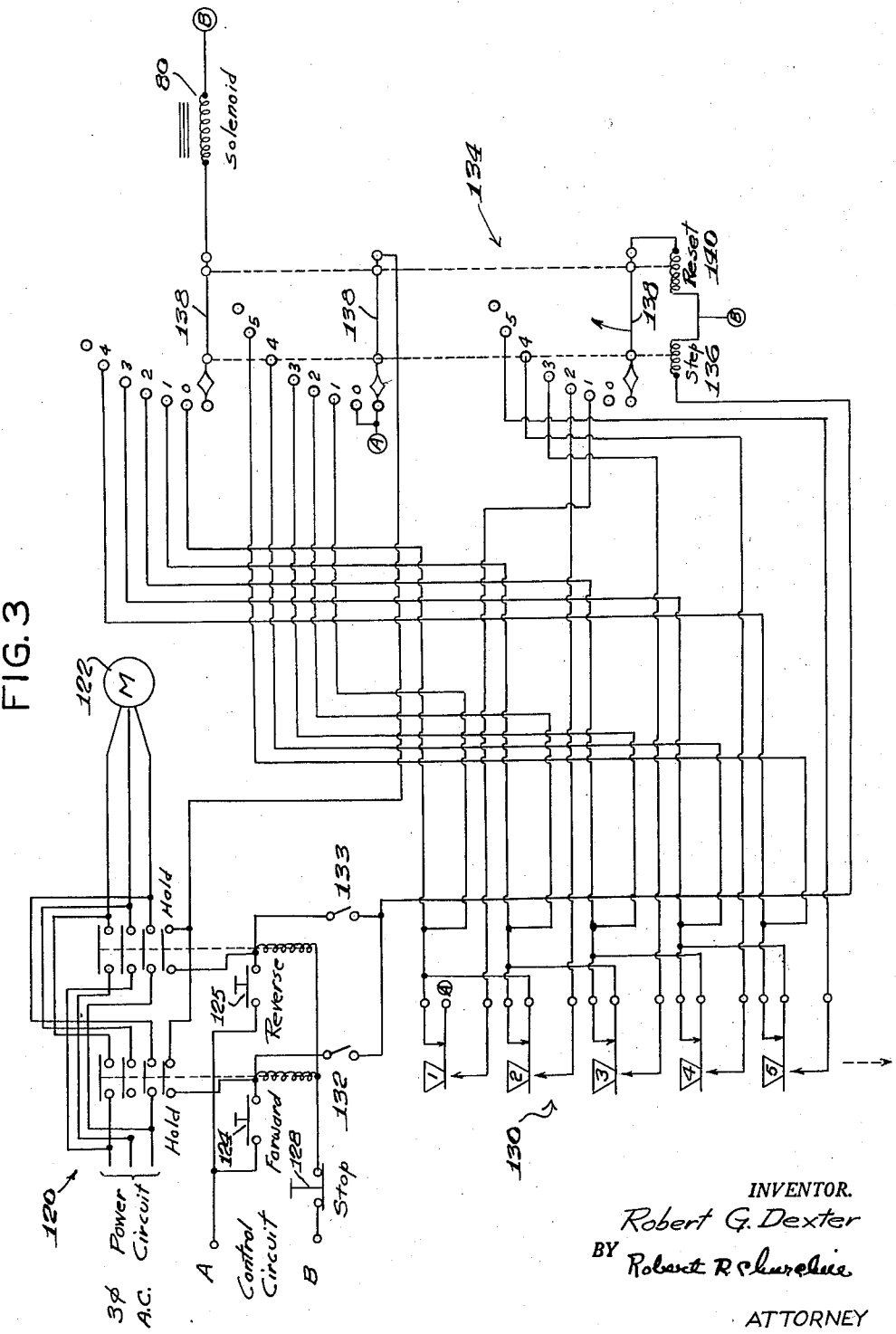

United States Patent Office 2,918,828
Patented Dec. 29, 1959

2,918,828

DRIVING MECHANISM

Robert G. Dexter, Harvard, Mass., assignor to Barkely & Dexter, Incorporated, Fitchburg, Mass., a corporation of Massachusetts Application May 22, 1957, Serial No. 660,958

16 Claims. (Cl. 74—436)

This invention relates to a driving mechanism.

The invention has for an object to provide a novel and improved driving mechanism adapted to be rotated at a uniform rate of speed for one or more exact revolutions and which embodies novel mechanism for effecting smoothly accelerated and decelerated starting and stopping of the driven element whereby to reduce starting and stopping shock to a minimum.

Another object of the invention is to provide a novel and improved driving mechanism of the character specified wherein provision is made for automatically controlling the driving mechanism to make one or more exact revolutions and for positively locking the driven element in its stopped position at the end of one or a preselected number of revolutions.

With these general objects in view and such others as may hereinafter appear, the invention consists in the driving mechanism and in the various structures, arrangements and combinations of parts thereof hereinafter described and particularly defined in the claims at the end of this specification.

In the drawings illustrating the preferred embodiment of the invention:

Fig. 1 is a plan view of the present driving mechanism;

Fig. 2 is a side elevation of the same, some of the parts being shown in cross section;

Fig. 3 is a wiring diagram illustrating one form of control for the present driving mechanism.

Figure 4:
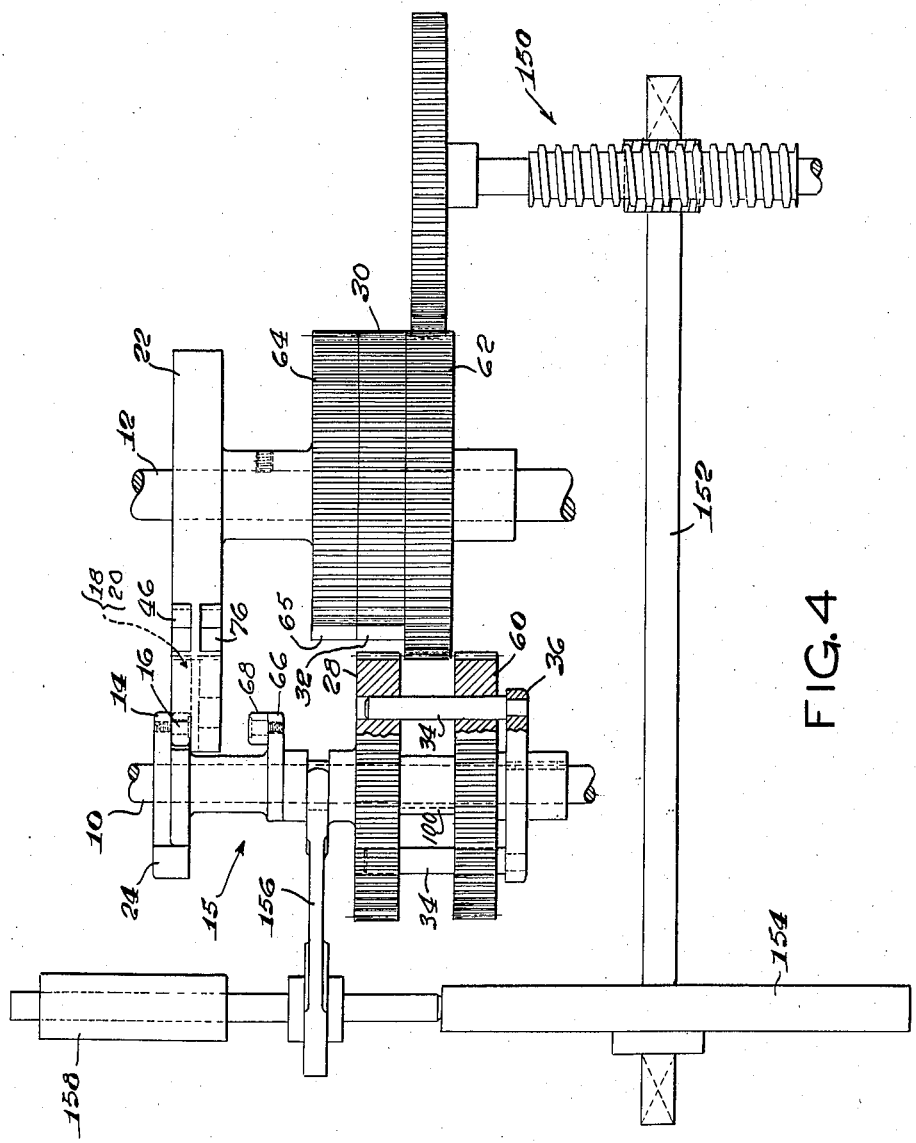
Fig. 4 is a detail view in side elevation of a modified form of control for the driving mechanism.

In general the present invention contemplates a novel rotary driving mechanism adapted for universal use and which may be used as a one revolution clutch drive or for making any predetermined number of revolutions wherein the driven element is rotated at a uniform speed and the starting and stopping movements are controlled to provide smoothly accelerated and decelerated starting and stopping of the driven element whereby to reduce starting and stopping shock to a minimum. Provision is also made for positively controlling the rotation of the driven element to make one or more exact revolutions at uniform speed and to positively lock the driven element in its stopped position at the end of one or a selected number of revolutions.

In the illustrated embodiment of the invention the novel drive mechanism embodies a modified form of Geneva drive adapted to effect smoothly accelerated and decelerated starting and stopping movements of the drive mechanism, the modified Geneva drive being disengaged after starting of the driven element, and the drive being thereafter continued through direct gearing at a uniform rate of speed for either one or a selected predetermined number of revolutions whereupon during the end of the one revolution or during the final revolution of the driven element, the driving mechanism is smoothly decelerated and brought to rest through interconnection with the modified Geneva drive to bring the driven element to rest at its initial starting position. Novel control mechanism is also provided for automatically controlling the operation of the driving mechanism to effect one or a preselected number of revolutions of the driven element during a period of operation.

Referring now to the drawings, the illustrated driving mechanism includes an input shaft 10 and an output shaft 12. In the operation of the present driving mechanism the input shaft 10 may be driven at a uniform rate of speed through any usual or preferred driving means, and as herein shown, the input shaft is provided with a drive arm 14 forming a part of a modified Geneva drive mechanism having a roller 16 arranged for cooperation with modified Geneva slots 18, 20 formed in one face, herein shown as the upper face of the driven member 22 of the modified Geneva mechanism, the driven member 22 being fast on the output shaft 12. An arcuate tongue 24 formed on the drive arm 14 is arranged to cooperate with a corresponding arcuate groove 26 in the driven member to lock the same in its stopped position.

The drive arm 14 forms part of a driving unit, indicated generally at 15, which also includes a spur gear 28 arranged to mesh with a spur gear 30 having some of its teeth removed, as indicated at 32, to permit operation of the Geneva drive connections during the starting and stopping operations. As indicated in Fig. 2, the driving unit 15 is connected to rotate with the input shaft 10 through pin connections 34 carried by a member 36 keyed to the input shaft 10 and which pins extend through mating holes in the spur gear 28, as shown, thus holding spur gear 60 in exact angular alignment with spur gear 28.

Figure 1A:
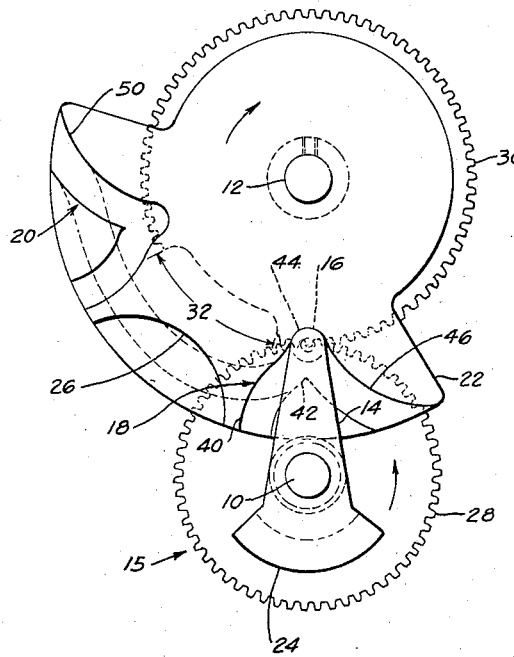
Figs. 1A and 1B are views similar to Fig. 1 showing the driving mechanism in different positions of operation.

In accordance with one feature of the present invention the modified Geneva slot 18 is shaped to permit the roller 16 of the drive arm 14 to enter a radial portion 40 of the slot at which time the locking elements 24, 26 become disengaged. After passing through the relatively short radial portion 40 of the slot to initiate rotation of the driven member 22, the roller 16 enters a curved portion 43 of modified Geneva slot 18 where further acceleration is accomplished, and then the roller 16 enters an epicycloidal portion 42 of the slot arranged to drive the driven member 22 at the desired uniform speed corresponding to the uniform speed of the driven gear 30 at which time the teeth of the gears 28, 30 become fully engaged to effect driving of the member 22 at a continued uniform rate of speed by the gears. The slot 18 continues to follow an epicycloidal path with the roller 16 in driving relation until it reaches the closed end 44 of the slot at which time the drive arm 14 is aligned with a center line drawn through the axes of the input and output shafts as shown in Fig. 1A. The slot then changes direction to follow an epicycloidal path or escape slot 46 to permit the roller 16 to be withdrawn from the slot during uniform rotation of the driven member 22 by the gear connections 28, 30. The escape slot 46, while herein shown as following the path required, serves no driving function at this time, and the portion 46 could be entirely open if desired since the gears 28, 30 are in driving engagement.

The modified Geneva slot 20 spaced from the slot 18 is similarly shaped in a reverse pattern and is disposed so that when the driven member 22 reaches the point in its revolution where the roller 16 of the drive arm 14 reenters the periphery of driven member 22, an epicycloidal path 50 of the slot 20 is provided for this reentry during the continued uniform speed of the driven member. This path continues to the closed end 52 of the slot 20 and then changes direction to follow the epicycloidal path 54. As the roller 16 leaves the closed end 52 of the slot and passes point 53 of path 54 the teeth of the gears 28, 30 become disengaged by virtue of the cutout portion 32, the roller 16 then following the curved path 55 and straight path 56, effecting gradual reduction in the speed of the driven member after leaving the epicycloidal portion 54 of slot 20 until it is brought to rest smoothly as the roller leaves the radial portion 56 of the slot. As the roller 16 leaves the radial portion 56, the Geneva locking members 24, 26 become engaged.

From the description thus far it will be observed that the present driving mechanism may be used with advantage as a one revolution clutch or driving unit wherein the driven element 22 may be started and stopped with smooth acceleration and deceleration whereby to reduce starting and stopping shock to a minimum and wherein the driven member is positively locked in its rest position at the end of one revolution. In practice the driving elements including the drive arm 14 and the gears 28, 30 are proportioned so that as the driven member 22 approaches the end of its revolution the drive arm 14 will be exactly in phase with relation to the driven member 22 and so that the roller 16 will enter the epicycloidal portion 50 of the slot 20 during uniform rotation of the driven member, the latter continuing its uniform rotation throughout the travel of the roller 16 in the portions 50, 52, 53, 54 of the slot and then gradually reducing in speed as the roller passes through the portions 55, 56 of the slot, the driven member being brought to rest when the roller leave the relatively short radial portion 56.

It will be understood that definite porportions between the driving and driven elements are maintained, as will be hereinafter more fully described, to effect operation of the driving mechanism, as thus far described, wherein the phase relationship is maintained between the driving and driven elements during one revolution of the driven element. In accordance with another feature of the present invention provision is made for permitting more than one revolution of the driven element at a uniform speed while still retaining the feature of starting and stopping with smooth acceleration and deceleration. Since the proportions between the driving and driven elements are such as to maintain the phase relationship for only the first revolution, provision is made for disengaging the driving elements 14, 28 of the drive unit 15 during a portion of the first revolution when the gears are engaged and for simultaneously engaging auxiliary driving and control elements 60, 66, 68 forming a part of the drive unit 15 to effect continuous rotation of the driven member or output shaft 12 at a uniform speed for a preselected number of revolutions and for maintaining the drive unit 15 in phase relationship during such rotation so that during the final revolution of the driven member 22 the driving elements 14, 28 may again be engaged in phase relationship with the driven member and elements 60, 66, 68 disengaged to bring the output shaft to rest smoothly.

As illustrated in Fig. 2, the auxiliary driving elements include a drive gear 60 also forming a part of the drive unit 15 and which is also connected to the input shaft 10 through the pin connections 34. The drive gear 60 is arranged to mesh with a full gear 62 fast on the output shaft 12 when the drive unit 15 is shifted vertically upward into aligment therewith. It will be observed that vertical shifting of the drive unit 15 will also disengage the gear 28 from the gear 30 and align the gear 28 with a third gear 64 fast on the output shaft 12, the gears 30, 62, 64 forming a unitary block connected to rotate together. The auxiliary driving and phase control elements also include a modified Geneva arm 66 having a roller 68 arranged to cooperate with a slot 70 formed in the underside of the driven member 22. It will be further observed that vertical shifting of the drive unit 15 will disengage the upper portion thereof from the drive pin connection 34 so that the gear 28 and arms 66, 14 are free to turn as a unit relative to the gear 60 and shaft 10. The gear 64 also has teeth removed from a portion thereof, as indicated at 65, to permit rotation of the upper portion of the driving unit relative to the driven element 22 during a portion of each cycle of operation of the driving mechanism. The gear 60 is supported on a flange 102 formed at the lower end of a sleeve 100 rotatably mounted on the input shaft 10 and which may be secured to and rotatable with the gear 28, the underside of the flange 102 resting on the upper face of the keyed member 36 when the driving unit is in its lowered position as shown. The driving elements including the gear 28, arms 66, 14 and sleeve 100 are connected to rotate together, the gear 60 being capable of rotation relative to the sleeve 100 when the driving unit is shifted upwardly to release the gear 28 and associated parts from the pins 34. As illustrated in Fig. 2, the shifting mechanism may include a yoke arm 106 cooperating with a shifting collar 108 interposed between the arm 66 and gear 28, the yoke arm 106 being pivoted at 110.

Figure 1B:
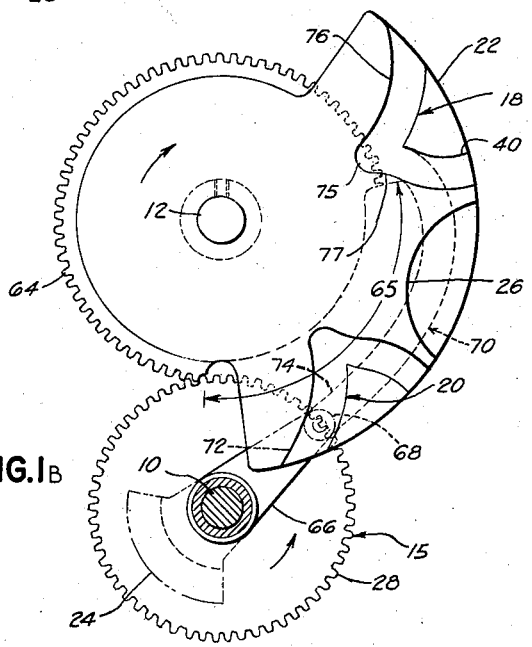

In the operation of the driving mechanism when used to make more than one revolution, the drive unit 15 is initially in its lowered position, as shown in Fig. 2, and when the drive unit 15 is rotated, rotation of the driven member is started with smooth acceleration, as above described, and as soon as or shortly after the teeth of the gears 28, 30 become fully engaged to effect uniform movement, the drive unit 15 may be shifted upwardly to engage the spur gears 60, 62 in meshing relation to drive the output shaft directly at a uniform speed. In order to maintain the upper portion of the drive unit 15 in phase relationship, the gear 64 effects driving of the gear 28 for a portion of each revolution until the driven member 22 reaches the point in its revolution where the roller 68 will enter the epicycloidal portion 72 of the slot 70 which coincides with the entrance portion 50 of the slot 20. While roller 68 is in this epicycloidal portion 72, as shown in Fig. 1B, the teeth of the gear 64 are discontinued. The epicycloidal portion 72 then merges with a substantially circumferential or concentric path 74 which in effect holds the upper portion of the drive unit 15 idle with respect to the driven element for an interval necessary to bring roller 68 into phase with element 22 at point 75. The slot 70 follows an epicycloidal path through portions 77, 75, 76 which coincide with portions 42, 44, 46 of the slot 18 in the upper face of the driven member 22, the roller 68 occupying epicycloidal portion 77 at the time the teeth of the gears 28, 64 are again engaged to effect rotation of the arms 66 and 14 at a uniform speed and in phase relation ship, the cycle being repeated each revolution of the driven member 22 so as to maintain the driving arm 14 in phase relationship with the driven member 22. Thereafter during the final revolution of the driven element 22 the drive unit is again shifted downwardly to disengage the direct driving gears 60, 62 and to engage the gears 28, 30 so that the roller 16 will enter the portion 50 of the slot 20 and follow the path thereof to bring the output shaft to rest smoothly in its locked position as above described. It will be observed that the cutaway portion 65 in the upper gear 64 is extended, as indicated, to remove more teeth than removed by the cutout portion 32 of the gear 30 whereby to effect disengagement of the gear 28 from the gear 64 while the roller 68 is in the epicycloidal portion 72 of slot 70 during operation of the mechanism for more than one revolution. It will also be observed that the present structure of modified Geneva movement with its epicycloidal portions assures complete and full meshing engagement of the gear teeth at uniform velocity after the accelerating movement, and also complete disengagement of the gearing at uniform velocity before the decelerating movement. As a result, starting and stopping shock is reduced to a minimum.

As above stated, it was found in practice that the illustrated driving mechanism is operative in the manner described only when certain definite proportions between the driving and driven elements are maintained. These proportions must be such that: roller 16 of arm 14 enters the periphery of driven member 22 in a radial direction; the length of the pitch line of gear 30 from point 44 around to point 52 must equal the pitch circumference of gear 28; and the radius of arm 14 to the center line of roller 16 must equal the pitch radius of gear 28.

In operation when only one revolution of the output shaft is desired the input shaft 10 must make two revolutions for one revolution of the output shaft 12. For example, assuming that the arm 14 is initially in its locked or at rest position with the arm 14 extended outwardly and in alignment with an extension of the center line passing through the axes of the input and output shafts 10, 12. It will now take 180° rotation of the arm 14 to assume an inwardly directed position on said center line, as shown in Fig. 1A, and during such rotation the driven element has been rotated through angle $\theta$. The teeth of the gears 28, 30 are fully engaged prior to this position so that during the next 360° rotation of the gear 28 the gear 30 will rotate through 360°—$2\theta$, and the arm 14 will again assume an inwardly extended aligned position with said center line. The continued rotation of the arm 14 through 180° to return the arm to its outwardly extended aligned position will move the driven element 22 through another angle $\theta$, thus completing one revolution of 360° of the driven element to two revolutions of the driving element. Thus, it will be seen that the phase relationship of the driving and driven elements may be positively maintained during one cycle of operation and that such relationship may be re-established after successive cycles by again engaging the gears 28, 30 during the preselected final revolution of the driven element. In practice the size of the gears and associated modified Geneva elements may be changed while maintaining the proportions defined. It will be obvious that the apparatus may be operated in either direction.

From the above description it will be seen that the present driving mechanism may be used with advantage as either a one revolution driving unit or a multi-revolution driving unit having a uniform speed wherein the starting and stopping operations are smoothly accelerated and decelerated to minimize shock and wherein the driven element is positively locked in its stopped position. In operation the pivoted shifter arm 106 may be manually operated to shift the drive unit 15 upwardly during the first revolution when more than one revolution is to be performed, and after a preselected number of revolutions the arm 106 may be again operated to shift the unit 15 downwardly during the final revolution to bring the driven member to rest with smooth deceleration.

As illustrated in Fig. 3, in one embodiment of the invention the driving mechanism may be electrically controlled to permit operation of the driving mechanism for one or more revolutions, and when more than one revolutoin is to be made provision is made for automatically shifting the unit 15 upwardly during the first revolution of the driven member 22 and to again shift the unit 15 downwardly during the final revolution after a preselected number of revolutions have been performed. The electrical control means includes a solenoid 80 operatively connected to the shifter arm 106 by a link 82. As shown in Fig. 3, the power circuit, indicated generally at 120, for controlling the operation of a driving motor 122 operatively connected to the input shaft 10 may include a conventional reversing motor starter having forward and reverse push buttons 124, 125 respectively so as to provide for operation of the unit in either direction, a stop button 128 being also provided.

The solenoid 80 may be included in the control circuit which is provided with a plurality of manually operated numbered push button switches, indicated generally at 130, to enable the operator to select the desired number of revolutions of the output shaft. The control circuit also includes two cam actuated switches 132, 133, one for the forward direction and one for reverse; and a plurality of stepping switches, indicated generally at 134, of the magnetically driven type such that energizing and deenergizing of the stepping coil 136 causes the selector switch arms 138 to advance one station or position. An automatic reset coil 140 is also provided to restore the arms 138 to their initial positions after reaching the predetermined count. The cam actuated switches 132, 133, one of which is shown in Fig. 2, may be arranged to be engaged by the roller 16, the switch being provided with an elongated cam face 142 capable of being engaged by the roller in either the up or down position of the shiftable driving unit 15. The revolution selector push buttons 130 may and preferably will be of the self-locking type.

In the operation of the driving mechanism, assuming that rotation of the driven member 22 is to be forward or clockwise, as indicated by the arrow in Fig. 1, and assuming also that but one revolution of the driven member 22 is desired, in which event the solenoid 80 will not be energized and no shifting of the drive unit 15 will occur, the No. 1 revolution selector push button is first pushed and then the forward starter button 124 may be pressed whereupon the drive motor 122 is started in the desired direction and the contactor interlocks, by-passing the starter button. Upon rotation of the input shaft 10, the roller 16 carried by the arm 14 enters the modified Geneva slot 18 and accelerates the output shaft 12 to the point where the teeth of the gears 28, 30 are fully in mesh. After nearly one revolution of the input shaft 10, during which time the output shaft 12 has completed less than one-half revolution, the roller 16 engages the cam face 142 to close the cam switch 132, the switch being immediately opened upon passing of the roller 16. During one revolution operation, upon closing and opening of the switch 132 the first time, at which time the output shaft has rotated less than one-half revolution, the arms 138 are advanced one step to the zero position, so that no contact is made through the selector switch No. 1. Upon rotation of the output shaft during the second one-half revolution the roller 16 enters the modified Geneva slot 20 to decelerate the driven member; the gears 28, 30 become disengaged; and after the roller 16 leaves the slot 20, and the locking members 24, 26 are engaged, the driven member has made one revolution and the continued rotation of the input shaft causes the roller 16 to close and open the cam switch 132 a second time. Thus, the step switch arms 138 are advanced a second time during the single revolution cycle of operation of the driven member, to make contact with station No. 1 of the stepping switches, such contact shutting off the motor. It will be seen that when the revolution selector push button is set to "one" the solenoid circuit is maintained open so that the solenoid is not permitted to operate.

When more than one revolution of the output shaft is desired, the selector push button corresponding to the desired number of revolutions is first pressed and then, assuming that rotation in the direction of the arrows is desired, the forward starter button 124 is pressed. The contactor interlock by-passes the starter button and the input shaft accelerates the output shaft 12 through engagement of the roller 16 with the modified Geneva slot 18, as before, until the teeth of the gears 28, 30 are fully engaged. After approximately one revolution of the input shaft, the roller 16 engages the cam switch 132 for the first time, at which time the output shaft has made less than one revolution. Since the circuitry has been set up for a predetermined number of revolutions other than "one" the shift solenoid is now energized causing the drive unit 15 to be shifted upwardly to engage the full gears 60, 62; the roller 16 being lifted up out of the plane of driven member 22; and the lower drive arm roller 68 is lifted into the plane of the cam slot 70 for maintaining the upper portion of the drive unit 15 in phase relationship for subsequently effecting deceleration and smooth stopping of the output shaft. With the gears 60, 62 directly engaged, the roller 16, now elevated out of the path of the slots 18, 20, engages the cam switch 132 once for every revolution of the output shaft, and hence an accumulative count of the output shaft is being noted by the circuitry. When the cam switch 132 is operated for the next to the last time, as determined by the previously set-in count, the circuitry is so arranged that the solenoid 80 is deenergized, thus returning the drive unit 15 to its lower position, and transferring the drive through the gears 28, 30. The roller 16 subsequently engages the modified Geneva slot 20, the gears 28, 30 becoming disengaged, and the roller 16 following the slot 20 brings the driven member to rest. After the roller 16 leaves the slot 20 it engages the cam switch 132 to effect opening of the motor circuit and closing of the reset coil 140 to restore the arms 138 to their initial starting position.

It will be noted that reverse operation may be accomplished in a similar manner by merely pressing the starter button 125 instead of 124, and effecting closing and opening of cam switch 133 instead of 132, the circuit 132, 133 being arranged so that when actuated with the mechanism rotating in one particular direction, the operation of the cam switch corresponding to the opposite direction has no effect.

It will be apparent that the components shown in the schematic diagram in Fig. 3 are illustrative of one electrical control mechanism and that other components or other control methods may be employed. For example, although a three phase controller is shown, appropriate conventional methods may be employed if single phase alternating or direct current is used. Also, although only five revolution selector buttons are shown, any number could be provided, and further, for economy of apparatus if the required number exceeds, for example, one hundred, the revolution selector switches could be arranged in banks of ten so that the first bank could handle the "units"; the second, the "tens"; and the third, the "hundreds." Also several sets of stepping relays could be arranged so that the first bank would take care of "units"; the second, "tens"; and the third, "hundreds." The same results could be accomplished in an electrical control circuit by means of magnetic impulse relays, or by the use of on/off type relays arranged in a pulse counting circuit. An electronic vacuum or gas tube decade counter could also be employed to perform the counting and sequencing functions.

In a modified form of control mechanism, as diagrammatically illustrated in Fig. 4, the driving mechanism may be mechanically controlled to effect stopping of the driving mechanism after a predetermined number of revolutions. As herein shown, the output shaft 12 may be connected through reduction gearing, indicated generally at 150, to a cam shaft 152 provided with a cam 154 arranged to cooperate with a shifter member 156 supported for vertical movement in a slide member 158. The reduction gearing ratio may be selected to permit any number of revolutions, say for example 25 to 1, so that the cam shaft 152 will make one revolution to twenty-five revolutions of the output shaft 12. The cam 154 may be designed to effect shifting of the drive unit 15 upwardly after the driven element 22 has started its first revolution and to thereafter effect lowering of the drive unit 15 during the final revolution so as to effect stopping of the driven element as above described. The input shaft 10 may be driven through any conventional electric motor connections, not shown, and the motor may be connected in a circuit which includes a manually operated starter switch for initially starting operation of the driving mechanism, and a stop switch which may be engaged by a portion of the cam 154 after the predetermined number of revolutions of the driven member has been completed to thus open the circuit and bring the motor to rest.

While specific examples of both electrical and mechanical means have been herein described for controlling the driving mechanism to effect operation thereof for one or a preselected number of revolutions, it will be apparent that other means actuated either pneumatically or hydraulically may be employed for automatically controlling the operation of the driving mechanism.

It will also be understood that wherever "epicycloid portions" are referred to in the specification and claims, it is intended to define the epicycloid curve generated on member 22 by the center line of roller 16 of arm 14 when gear 28 is rolled on gear 30.

From the above description it will be seen that the present driving mechanism embodying a modified Geneva drive provides an accurate, and precise smoothly accelerated and decelerated driving mechanism for effecting one or any selected number of revolutions of a driven element.

While the preferred embodiment of the invention has been herein illustrated and described, it will be understood that the invention may be embodied in other forms within the scope of the following claims.

Having thus described the invention, what is claimed is:

1. In a one revolution driving mechanism, in combination, a driving element and a driven element, disengageable driving connections between said driving and driven elements operative to rotate the driven element at a uniform rate, a second disengageable driving connection between said driving and driven elements operative upon disengagement of said first driving connections to effect smoothly accelerated and decelerated starting and stopping of said driven element, said second driving connection being also operative to rotate the driven element at a uniform rate during initial engagement and final disengagement of said first driving connections, said second driving connection remaining in phase relationship with said first driving connection during one revolution of said driven element to bring the driven element to rest with smooth deceleration at the end of said one revolution, and means for positively locking said driven element in its stopped position, said second driving connection including a modified Geneva drive including an arm carried by said driving element, and starting and stopping slots formed in said driven element for cooperation with said arm, said driving connections being proportioned such that the driving element makes two revolutions to one revolution of the driven element.

2. In a driving mechanism, in combination, a driving element and a driven element, disengageable driving connections between said driving and driven elements operative to rotate the driven element at a uniform rate, a second disengageable driving connection between said driving and driven elements operative during disengagement of said first driving connections to effect smoothly accelerated and decelerated starting and stopping of said driven element, said second driving connection being also operative to rotate the driven element at a uniform rate during initial engagement and final disengagement of said first driving connections, said second driving connection remaining in phase reationship with said first driving connection during the first revolution of said driven element to bring the driven element to rest with smooth deceleration, means for disconnecting said second driving connection during the first revolution of the driven element when more than one revolution is to be made, means for maintaining the disconnected second driving connection in phase relationship during multi-rotation of said driven element at a uniform rate, whereby upon again connecting said second driving connection during the final revolution it will be in phase with the driven element to bring the same to rest with smooth deceleration, and means for positively locking the driven element in its stopped position.

3. In a driving mechanism, in combination, a driving element and a driven element, disengageable driving connections between said driving and driven elements operative to rotate the driven element at a uniform rate, a second disengageable driving connection between said driving and driven elements operative during disengagement of said first driving connections to effect smoothly accelerated and decelerated starting and stopping of said driven element, said second driving connection being also operative to rotate the driven element at a uniform rate during initial engagement and final disengagement of said first driving connections, said second driving connection remaining in phase relationship with said first driving connection during the first revolution of said driven element to bring the driven element to rest with smooth deceleration, means for disconnecting said second driving connection during the first revolution of the driven element when more than one revolution is to be made, means for maintaining the disconnected second driving connection in phase relationship during multi-rotation of said driven element at a uniform rate, whereby upon again connecting said second driving connection during the final revolution it will be in phase with the driven element to bring the same to rest with smooth deceleration, means for positively locking the driven element in its stopped position, and control means for automatically effecting disconnection of said second driving connection during the first revolution of the driven element, and for again effecting connection thereof during the final revolution of the driven element after a preselected number of revolutions have been made.

4. One revolution driving mechanism comprising an input shaft, an output shaft, disengageable gearing connections between the input and output shafts, modified Geneva drive connections between said shafts, said modified Geneva drive connections being arranged to initiate rotation of the output shaft to effect smoothly accelerated starting thereof prior to engagement of said gearing connections and to then effect rotation at a uniform rate until the gearing is fully engaged, and conversely, to terminate rotation of the output shaft from a uniform rate to effect smoothly decelerated stopping thereof when the gearing is again disengaged, said modified Geneva drive connections comprising a driver arm carried by said input shaft and modified Geneva slots carried by said output shaft, said driving connections being proportioned such that the input shaft makes two revolutions for each revolution of the output shaft.

5. One revolution driving mechanism comprising an input shaft, an output shaft, disengageable gearing connections between the input and output shafts including a segmental driven gear, modified Geneva drive connections between said shafts including a driver arm carried by said input shaft and modified starting and stopping Geneva slots carried by said output shaft, said modified Geneva drive connections being arranged to initiate rotation of the output shaft to effect smoothly accelerated starting thereof prior to engagement of said gearing connections and to then effect rotation at a uniform rate until the gearing is fully engaged, and conversely, to terminate rotation of the output shaft from a uniform rate to effect smoothly decelerated stopping thereof when the gearing is again disengaged, and means for positively locking the output shaft in its stopped position, the proportions of the gearing connections being such that the pitch circumference of the driving gear is equal to that portion of the pitch circumference of the toothed portion of the driven gear between the inner ends of said slots; the radius of said driving arm being equal to the pitch radius of said driving gear; and the arcuate spacing between said starting and stopping slots is such that the arm enters and leaves the periphery of the driven member in a radial direction relative to the driven member.

6. Driving mechanism comprising an input shaft, an output shaft, disengageable gearing connections between the input and output shafts, modified Geneva drive connections between said shafts, said modified Geneva drive connections being arranged to initiate rotation of the output shaft to effect smoothly accelerated starting thereof prior to engagement of said gearing connections and to then effect rotation at a uniform rate until the gearing is fully engaged, and conversely, to terminate rotation of the output shaft from a uniform rate to effect smoothly decelerated stopping thereof when the gearing is again disengaged, said modified Geneva drive including a drive arm rotatable with said input shaft, and a driven member fast on said output shaft, said driven member having a curved slot for cooperation with said drive arm to first effect smoothly accelerated starting thereof and then an epicycloidal portion of said slot to effect uniform rotation of the driven member until said gearing connections are engaged, said driven member having a second curved slot provided with an epicycloidal portion arranged in a reverse pattern for cooperation with said arm to effect uniform rotation of the driven member when the gearing connections are again disengaged, the entrance of said first slot and the exit of said second slot being radial with respect to the driven member whereby to effect smoothly accelerated and decelerated starting and stopping of said driven member.

7. Driving mechanism comprising an input shaft, an output shaft, disengageable gearing connections between the input and output shafts, modified Geneva drive connections between said shafts, said modified Geneva drive connections being arranged to initiate rotation of the output shaft to effect smoothly accelerated starting thereof prior to engagement of said gearing connections and to then effect rotation at a uniform rate until the gearing is fully engaged, and conversely, to terminate rotation of the output shaft from a uniform rate to effect smoothly decelerated stopping thereof when the gearing is again disengaged, said modified Geneva drive including a drive arm rotatable with said input shaft, and a driven member fast on said output shaft, said driven member having a curved slot provided with an epicycloidal portion for cooperation with said drive arm to first effect smoothly accelerated starting and then uniform rotation of the driven member until said gearing connections are engaged, said driven member having a second curved slot provided with an epicycloidal portion arranged in a reverse pattern for cooperation with said arm to effect uniform rotation of the driven member when the gearing connections are again disengaged, the entrance of said first slot and the exit of said second slot being radial with respect to the driven member whereby to effect smoothly accelerated and decelerated starting and stopping of said driven member, and Geneva locking elements between said driving arm and said driven member for positively locking the driven member in its stopped position.

8. In a driving mechanism, in combination, an input shaft and an output shaft, gearing connections between said input and output shafts, Geneva drive connections between the shafts including a drive arm fast on said input shaft and provided with a roller, a driven member fast on said output shaft, said driven member having starting and stopping slots in one face thereof for cooperation with said roller, the gearing on said output shaft having cutout portions effecting disengagement of said gearing to enable the starting and stopping movements to be controlled by said Geneva drive connections, said starting slot being shaped radially for a relatively short distance and then curved to initiate rotation of the output shaft and to effect smoothly accelerated starting thereof, said curved portion terminating in an epicycloidal portion to effect uniform rotation of the output shaft until the gearing is fully engaged, said arm being withdrawn from the driven member through a different portion of said slot during rotation of the driven member at a uniform speed, said stopping slot being spaced from said starting slot and arranged in a reverse pattern for permitting the drive arm to enter the stopping slot during rotation of the driven member at a uniform speed and to then decelerate and bring the driven member to rest smoothly when the gearing is again disengaged, and Geneva locking connections formed on said arm and said driven member for positively locking the driven member in its stopped position, said driving connections remaining in phase relationship during one revolution of said driven member.

9. In a driving mechanism, in combination, an input shaft and an output shaft, gearing connections between said input and output shafts, Geneva drive connections between the shafts including a drive arm fast on said input shaft and provided with a roller, a driven member fast on said output shaft, said driven member having starting and stopping slots in one face thereof for co-operation with said roller, the gearing on said output shaft having cutout portions effecting disengagement of said gearing to enable the starting and stopping movements to be controlled by said Geneva drive connections, said starting slot being shaped radially for a relatively short distance to initiate rotation of the output shaft and then curved to effect smoothly accelerated starting thereof, said curved portion terminating in an epicycloidal portion to effect uniform rotation of the output shaft until the gearing is fully engaged, said arm being withdrawn from the driven member through a different portion of said slot during rotation of the driven member at a uniform speed, said stopping slot being spaced from said starting slot and arranged in a reverse pattern for permitting the drive arm to enter the stopping slot during rotation of the driven member at a uniform speed and to then decelerate and bring the driven member to rest smoothly when the gearing is again disengaged, Geneva locking connections formed on said arm and said driven member for positively locking the driven member in its stopped position, said driving connections remaining in phase relationship during one revolution of said driven member, means for shifting said input shaft connections out of engagement with said driven member and free of rotation with said input shaft during the first revolution when more than one revolution of the driven member is to be made, auxiliary gearing connections between said input and output shafts arranged to be engaged upon said shifting operation to permit multi-rotation of said output shaft at a uniform rate, and means for maintaining said shifted input shaft connections in phase relationship with said driven member during multi-rotation thereof including a second disengageable gearing connection between the output shaft and the shifted connection arranged to rotate the shifted connection during a portion of each revolution of the output shaft, and a second arm on said shifted connection having a roller for cooperation with a slot in the second face of said driven member during disengagement of said second gearing connection, said second face slot having epicycloidal entrance and exit portions and an intermediate concentric portion arranged to hold the shifted connections idle for a period corresponding to the out of phase relationship whereby to maintain the shifted driving connections in readiness to bring the output shaft to rest when the shifted connections are subsequently returned to their initial driving engagement during the final revolution of a selected number of revolutions.

10. Driving mechanism as defined in claim 9 which includes control means for automatically effecting shifting of said input driving connection during the first revolution of a multi-revolution operation of the driven member, and for again shifting the input driving connections back to their initial position during the final revolution of said driven member.

11. Driving mechanism as defined in claim 9 which includes control means responsive to the rotation of said output shaft for automatically effecting shifting of said input driving connections during the first revolution of a multi-revolution rotation of said driven member and for again shifting said input driving connections back to their initial position during the final revolution of said driven member after a predetermined number of revolutions have been made.

12. Driving mechanism as defined in claim 11 wherein the control means includes a cam actuated shifter, and connections between the cam actuated shifter and said output shaft for controlling the operation of said cam actuated shifter.

13. Driving mechanism as defined in claim 9 which includes control means responsive to the rotation of said input shaft connections for automatically effecting shifting of said input driving connections during the first revolution of a multi-revolution rotation of said driven member, and for again shifting said input driving connections back to their initial position during the final revolution of said driven member after a preselected number of revolutions have been performed.

14. Driving mechanism as defined in claim 9 which includes electrical control means responsive to the rotation of said shiftable input shaft connections, said electrical control means including a circuit having a solenoid operated shifter, a plurality of numbered revolution selector switches, and a plurality of magnetically operated stepping switches arranged to be energized and deenergized each revolution of said input shaft connections, said stepping switches being arranged to close a circuit to energize said solenoid during the first revolution of a multi-revolution rotation of the driven member to effect said shifting operation, and to deenergize said solenoid during the final revolution of said driven member after the preselected number of revolutions has been performed.

15. Driving mechanism as defined in claim 14 wherein the stepping switches are arranged to maintain the circuit to the solenoid open and non-responsive to the first revolution of said input shaft connections when the number one revolution selector switch is pressed.

16. Driving mechanism as defined in claim 8 wherein the proportions of the gearing connections are such that the pitch circumference of the driving gear is equal to that portion of the pitch circumference of the toothed portion of the driven gear between the terminating ends of said epicycloidal portions; wherein the radius of said driving arm is equal to the pitch radius of said driving gear; and wherein the arcuate spacing between said starting and stopping slots is such that the roller enters and leaves the periphery of the driven member in a radial direction relative to the driven member.

References Cited in the file of this patent
UNITED STATES PATENTS
2,449,852    Jones _____ Sept. 21, 1958

OTHER REFERENCES
Publication; Ingenious Mechanisms, vol. 3, First Edition, The Industrial Press, pages 52–54.